UNITED STATES PATENT OFFICE.

STEFAN HANSEL AND EUGEN HORNUNG, OF VIENNA, AUSTRIA-HUNGARY, ASSIGNORS TO BRÜDER HANSEL, OF BÄRN, AUSTRIA-HUNGARY.

WATERPROOFING COATING.

SPECIFICATION forming part of Letters Patent No. 658,437, dated September 25, 1900.

Application filed January 21, 1898. Serial No. 667,486. (No specimens.)

*To all whom it may concern:*

Be it known that we, STEFAN HANSEL and EUGEN HORNUNG, subjects of the Emperor of Austria-Hungary, residing at Vienna, in the Province of Lower Austria, in the Empire of Austria-Hungary, have invented certain new and useful Improvements in Waterproofing Coatings and Impregnating Substances and Processes for the Manufacture of the Same; and we do hereby declare the following to be a full, clear, and exact description of the invention, such as will enable others skilled in the art to which it appertains to make and use the same.

This invention relates to a novel coating and impregnating mass for paper, fabric, felt, cellulose, wood-pulp, and in general for animal and vegetable fibrous materials, which by treatment with the substance are rendered proof against the action of damp and at the same time remain supple or flexible and elastic, the said materials also possessing the advantage of greater strength than the known rubber-treated papers and fabrics.

The coating and impregnating mass contains as its principal constituents albuminous materials (albumen or gluten) and india-rubber, (or in place of the latter gutta-percha or a substitute for india-rubber or gutta-percha or oil-varnish,) and may also contain, where a high degree of flexibility or suppleness is desired, an addition of glycerin, syrup, molasses, or of fat, oils, or the like.

In carrying out the process of manufacture the albumen or gluten is dissolved cold in about the same quantity of water or of another solvent. In a similar way a solution of the same consistency is obtained of india-rubber, gutta-percha, or their substitutes in benzin or in another suitable solvent. The two solutions are then intimately mixed together either by hand or by means of mixing apparatus of any suitable kind and in proportions which vary according to the articles to be manufactured. In case the mixture is to be employed for obtaining as high a degree as possible of suppleness or flexibility it has added to it substances, such as glycerin, syrup, molasses, fats or oils, oil-rubber, (an artificial rubber made from linseed-oil,) or vulcanized oil. The amount of this addition depends upon the degree of suppleness to be obtained. For the purpose of preserving the albumen or gluten present in the mixture unaltered the mixture has added to it a small quantity (about one per cent. of the quantity of albumen) of salicylic acid, carbolic acid, or of any other suitable antiseptic.

As examples of suitable proportions for the mixture, we give the following two, of which the first is a coating or impregnating mass prepared without the addition of materials for increasing the suppleness or flexibility and the second a similar mass with the addition of such materials:

I. Twenty-five parts, by weight, of albumen or gluten; twenty-five parts, by weight, of water; 0.25 part, by weight, of salicylic acid or carbolic acid, and three to ten parts, by weight, of india-rubber, gutta-percha, or their substitutes.

II. Twenty-five parts, by weight, of albumen or gluten; twenty-five parts, by weight, of water; 0.25 part, by weight, of salicylic acid or carbolic acid; five to thirteen parts, by weight, of glycerin, syrup, fat, oil, or oil-rubber, and three to ten parts, by weight, of india-rubber.

It will be obvious that the mass can be suitably colored by the addition of the required coloring-matters without departing from the principle of the invention.

The albumen contained in the substance is coagulated, when the mixture has been made, in a known manner—for example, by drawing the material impregnated or coated with the mixture between hot rollers. The coagulation may, however, be effected previously to having the mixture made, in which case the albumen or gluten dissolved in water is coagulated by heating and the coagulated mass removed from the water and mixed with the other above-named materials.

The india-rubber (gutta-percha, &c.) in the coating or impregnating mass is vulcanized in the known manner. The vulcanization can, however, if desired, be effected before the coagulation of the albuminous substances contained in the mixture. The two processes can also take place simultaneously by adding the substance, preferably sulfur, necessary for the vulcanization to the india-rubber, the gutta-percha, or the like before their mixture with the albumen or gluten solution, the mass being then vulcanized by heating in the known manner.

Substances manufactured in the above-described manner are, when necessary, thinned with benzin, turpentine, or other known solvents before they are used in order to make them more appropriate for coating purposes and are then applied to the materials to be rendered waterproof by hand or by means of any known devices. The application can be repeated after each drying operation, according to the desired strength of the layer which it is desired to apply or according to the degree to which the impregnation is to be carried. The impregnation can be effected in the manner usually employed with other known impregnating substances, or when it is a matter of converting loose fibrous materials to a plastic mass by felting the said fibers can be treated with the impregnating mass in kneading-machines to form a mass afterward to be molded. By these means we obtain upon the material to be treated a very flexible or supple coating, which resembles india-rubber and is insoluble in water, or we obtain an impregnated material possessing these properties.

For the purpose of increasing the strength of paper rendered waterproof in the above-described manner we can press fabric upon the said paper immediately after the substance has been applied to it or we can press the fabric between two layers of paper so prepared, after which the said fabric or the material manufactured from paper and fabric is coated or impregnated with the mass. In order to impart a pleasing appearance to materials made waterproof by coating or impregnation, as above described, they can be passed in a known manner through smoothing or engraving rollers, so as to be highly polished or to receive a design of any desired kind.

We claim as our invention—

1. A more or less fluid waterproofing composition consisting of albumen or gluten, a solution of india-rubber or a substitute thereof and an antiseptic, substantially as and in or about in the proportions set forth.

2. A more or less fluid waterproofing composition, consisting of coagulated gluten or albumen, a solution of india-rubber or a substitute thereof, an antiseptic together with a fatty or oleaginous material, substantially as and in or about in the proportions set forth.

In witness whereof we have hereunto set our hands in presence of two witnesses.

STEFAN HANSEL.
EUGEN HORNUNG.

Witnesses:
HENRY C. CARPENTER,
CHAS. E. CARPENTER.